(12) United States Patent
Toub et al.

(10) Patent No.: US 8,276,154 B2
(45) Date of Patent: Sep. 25, 2012

(54) HASH PARTITIONING STREAMED DATA

(75) Inventors: Stephen H. Toub, Seattle, WA (US); Igor Ostrovsky, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 425 days.

(21) Appl. No.: 12/642,233

(22) Filed: Dec. 18, 2009

(65) Prior Publication Data

US 2011/0154359 A1    Jun. 23, 2011

(51) Int. Cl.
*G06F 9/46*    (2006.01)
(52) U.S. Cl. ..................................... 718/106
(58) Field of Classification Search .................. None
See application file for complete search history.

(56) References Cited

U.S. PATENT DOCUMENTS

| | | | |
|---|---|---|---|
| 4,559,614 A * | 12/1985 | Peek et al. | 718/100 |
| 2006/0117316 A1 * | 6/2006 | Cismas et al. | 718/103 |
| 2006/0218123 A1 | 9/2006 | Chowdhuri | |
| 2009/0007116 A1 | 1/2009 | Duffy | |
| 2009/0007137 A1 | 1/2009 | Duffy | |
| 2009/0031175 A1 | 1/2009 | Aggarwal | |
| 2009/0144346 A1 | 6/2009 | Duffy | |
| 2011/0196947 A1 * | 8/2011 | Ladd et al. | 709/222 |

OTHER PUBLICATIONS

DB2 Enterprise Edition, Mar. 19, 2008, 7 pages. http://www.databasejournal.com/features/db2/article.php/10896_3733021_3/.
Yu, Yuan, et al., "DryadLINQ: A System for General-Purpose Distributed Data-Parallel Computing Using a High_Level Language", Based on information and belief available, at least as early as Nov. 26, 2009, 12 pages.

* cited by examiner

*Primary Examiner* — Emerson Puente
*Assistant Examiner* — Gregory Kessler
(74) *Attorney, Agent, or Firm* — Workman Nydegger

(57) ABSTRACT

The present invention extends to methods, systems, and computer program products for partitioning streaming data. Embodiments of the invention can be used to hash partition a stream of data and thus avoids unnecessary memory usage (e.g., associated with buffering). Hash partitioning can be used to split an input sequence (e.g., a data stream) into multiple partitions that can be processed independently. Other embodiments of the invention can be used to hash repartition a plurality of streams of data. Hash repartitioning converts a set of partitions into another set of partitions with the hash partitioned property. Partitioning and repartitioning can be done in a streaming manner at runtime by exchanging values between worker threads responsible for different partitions.

10 Claims, 4 Drawing Sheets

HASH PARTITIONING STREAMED DATA

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks is distributed across a number of different computer systems and/or a number of different computing environments.

In data-parallel program environments, a sequence of inputs is processed in parallel in order to reduce processing time. Different worker threads process different partitions of data. Processing a sequence of inputs in parallel can often be done more efficiently when "equal" elements (by some equivalence relation) are in the same partition. To ensure that equal elements are in the same partition, hash partitioning can be used. Hash partitioning is typically a synchronous operation that includes reading in an entire sequence of inputs and storing (buffering) the sequence of inputs (e.g., in memory, to disk, etc.). The buffered sequence of inputs is then rearranged into hash-partitioned partitions.

BRIEF SUMMARY

The present invention extends to methods, systems, and computer program products for partitioning streaming data. For example, in some embodiments, data elements from an input data stream are distributed into a plurality of output data streams. A first worker thread, from among the plurality of worker threads, acquires a lock on the input data stream. The lock is shared among the plurality of worker threads. The first worker thread accesses (and removes) one or more data elements from the input data stream subsequent to locking the input data stream. The first worker thread releases the lock on the input data stream.

For each data element in the one or more data elements, the first worker thread uses an equivalence function to identify the appropriate output data stream, from among the plurality of output data streams, for outputting the data element. The first worker thread assigns the data element to another worker thread corresponding to the identified appropriate output data stream. Accordingly, data elements determined to be equivalent by the equivalence function are assigned to the same worker thread.

Before and/or after accessing data elements from the input data stream, the first worker thread determines if other worker threads assigned any data elements from the input data stream to the first worker thread.

In other embodiments, a plurality of input data streams is repartitioned. Each of a plurality of worker threads accesses one or more data elements from an input data stream. The data elements were determined to be equivalent by a prior equivalence function.

For each of the one or more data elements, each of the plurality of worker threads uses an equivalence function to identify the appropriate output data stream, from among a plurality of output data streams, for outputting the data element. The data element is assigned to a worker thread corresponding to the identified appropriate output data stream. Accordingly, data elements determined to be equivalent by the equivalence function are assigned to the same worker thread.

Before and/or after accessing data elements, each of the plurality of worker threads checks a storage buffer for data elements assigned to the worker thread by other worker threads. Data elements in the storage buffer were determined to be equivalent by the equivalence function. Any data elements in the storage buffer are output on the worker thread's corresponding output data stream.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1:
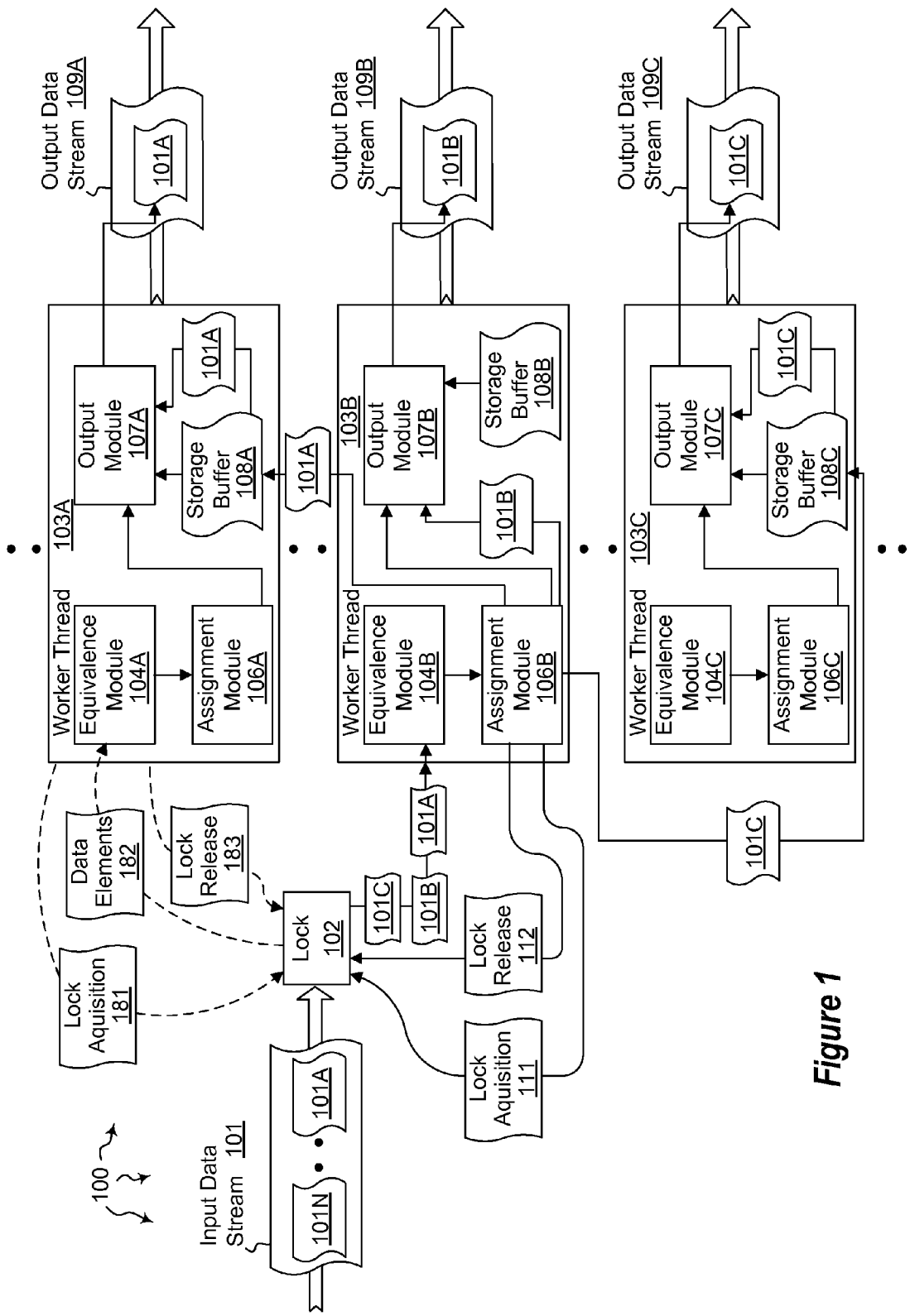
FIG. 1 illustrates an example computer architecture that facilitates distributing elements from an input data stream across a plurality of output data streams.

The present invention extends to methods, systems, and computer program products for partitioning streaming data. For example, in some embodiments, data elements from an input data stream are distributed into a plurality of output data streams. A first worker thread, from among the plurality of worker threads, acquires a lock on the input data stream. The lock is shared among the plurality of worker threads. The first worker thread accesses (and removes) one or more data elements from the input data stream subsequent to locking the input data stream. The first worker thread releases the lock on the input data stream.

For each data element in the one or more data elements, the first worker thread uses an equivalence function to identify the appropriate output data stream, from among the plurality of output data streams, for outputting the data element. The first worker thread assigns the data element to another worker thread corresponding to the identified appropriate output data stream. Accordingly, data elements determined to be equivalent by the equivalence function are assigned to the same worker thread.

Before and/or after accessing data elements from the input data stream, the first worker thread determines if other worker threads assigned any data elements from the input data stream to the first worker thread. For example, the first worker thread can check a storage buffer allocated to the first worker thread. Any data elements in the storage buffer are output on the first worker thread's corresponding output data stream.

In other embodiments, a plurality of input data streams is repartitioned. Each of a plurality of worker threads accesses one or more data elements from an input data stream. The data elements were determined to be equivalent by a prior equivalence function.

For each of the one or more data elements, each of the plurality of worker threads uses an equivalence function to identify the appropriate output data stream, from among a plurality of output data streams, for outputting the data element. The data element is assigned to a worker thread corresponding to the identified appropriate output data stream. Accordingly, data elements determined to be equivalent by the equivalence function are assigned to the same worker thread.

Before and/or after accessing data elements, each of the plurality of worker threads checks a storage buffer for data elements assigned to the worker thread by other worker threads. Data elements in the storage buffer were determined to be equivalent by the equivalence function. Any data elements in the storage buffer are output on the worker thread's corresponding output data stream.

Embodiments of the present invention may comprise or utilize a special-purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general-purpose or special-purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer executable instructions or data structures and which can be accessed by a general-purpose or special-purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general-purpose computer, special-purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

FIG. 1 illustrates an example computer architecture 100 that facilitates distributing elements from an input data stream across a plurality of output data streams. Referring to FIG. 1, computer architecture 100 includes input data stream 101, lock 102, worker threads 103A, 103B, and 103C, and output data streams 109A, 109B, and 109C. Additional worker threads and corresponding output data streams (not depicted) can also be present. Each of the components (depicted and not depicted) can be connected to one another over (or be part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Each worker thread includes an equivalence module, an assignment module, an output module, and a storage buffer. For example, worker thread 103A includes equivalence module 104A, assignment module 106A, output module 107A, and storage buffer 108A. Similarly, worker thread 103B includes equivalence module 104B, assignment module 106B, output module 107B, and storage buffer 108B. Likewise, worker thread 103C includes equivalence module 104C, assignment module 106C, output module 107C, and storage buffer 108C.

Generally, data elements in input data stream 101 (e.g., data elements 101A through 101N) are streamed to worker threads 203A, 203B, 203C, etc. Lock 102 is shared among the worker threads. From time to time, for example, in a predefined order, in accordance with an algorithm, when a worker thread has resources available, etc., each worker thread acquires lock 102. Upon acquiring lock 102, the worker thread accesses one more data elements from input data stream 101. The worker thread then releases lock 102.

After accessing one or more data elements, an equivalence module is used to determine equivalence for each data element in accordance with an equivalence function. Each equivalence module can implement the same equivalence function. For example, equivalence modules 104A, 104B, and 104C, can implement the same equivalence function. Thus, when data elements from input data stream 101 are distributing to a plurality of worker threads, equivalence between data elements can still be uniformly determined.

An equivalence function can be virtually any function that implements some equivalence relation to determine when the equivalence function views different data elements as equal. "Equivalent" can mean different things in different contexts: the values could be equal, equal modulo some value, strings with a common first character, etc. For example, an equivalence function may be equal modulo 4. As such, 5 and 9 are viewed as equal, 6, 10, and 18 are viewed as equal, etc.

Each worker thread can be assigned responsibility for processing a subset of data elements determined to be equivalent by the equivalence function. For example, using the equivalence function equal modulo 4, a first worker thread can be assigned responsibility for values of 0, a second worker thread can be assigned responsibility for values of 1, a third worker thread can be assigned responsibility for values of 2, and a fourth worker thread can be assigned responsibility for values of 3.

Each assignment module (e.g., 106A, 106B, 106C, etc) can maintain an indication (e.g., a list) of what subset of equivalent data each worker thread is responsible for. Thus, upon determining equivalence for a data element, the assignment module assigns data element to the appropriate worker thread. When an assignment module determines that a different worker thread is responsible for a data element, the assignment module can store the data element in a storage buffer at the different worker thread. When an assignment module determines that its worker thread is responsible for a data element, the assignment module can send the data element to the output module for the worker thread.

From time to time, such as, for example, before and/or after accessing data from input data stream 101, each worker thread checks its storage buffer for assigned data elements from other worker threads. If the storage buffer contains assigned data elements, the assigned data elements are sent to the worker thread's output module. If the storage buffer does not contain any assigned data elements, the worker thread can again attempt to acquire lock 102.

Thus, each worker thread assigns equivalent data elements to responsible worker threads and also outputs equivalent data for which it is responsible. Accordingly, worker threads, including worker threads 103A-103C, can cooperatively interoperate to distribute data from input data stream 101 across output data streams, including output data streams 109A-109C, in accordance with an equivalence function. The practical result is that each worker thread processes a partition of data elements, with a high level of certainty that no duplicates cross partitions.

In some embodiments, hash partitioning is used to assign equivalent data elements to the same partition (e.g., to the same output data stream). Hash partitioning uses hash codes to insure that equivalent data elements are assigned to same partition. For example, to count how many distinct elements are in the input sequence, the input sequence can be hash partitioned, and each worker counts the distinct elements in its partition. Hash partitioning essentially guarantees that all duplicates will be in the same partition, and thus different workers will not double-count.

To implement hash partitioning, a hash code is computed for every data element. The hash codes are then mapped into partitions in some fashion (e.g., using a list). One example mapping scheme assigns elements whose hash codes H obeys (H % partition_count)=partition_index into partition whose index is partition_index. However, other mapping schemes are also possible. Multiplying H by a prime avoids some degenerate cases when the hash code distribution is not uniform (e.g. when all hash codes are even numbers, and partition_count is also even).

To implement streamed hash partitioning, an input sequence (e.g., input data stream 101) is read by multiple workers in parallel by using a chunk partitioning algorithm. When a worker needs a new element to process, it locks the input sequence, removes one or more elements from the input sequence, and releases a lock on the input sequence. Every worker knows which hash codes it is responsible for processing. For example, in the case of 5 workers, worker 0 could be processing those elements whose hash codes are divisible by 5. The worker will be reading in the data, processing the elements whose hash code is divisible by 5, and putting all other elements aside into an element exchange data structure.

Each time the worker 0 is ready to process the next element, it checks the element exchange data structure whether any of the other workers found elements whose hash code is divisible by 5. If no such elements have been found, the worker pulls the next element from the shared input sequence. If the hash code of the element is divisible by 5, the worker processes the element. If the hash code is not divisible by 5, the worker places the element into the element exchange, and repeats the process.

One possible implementation of the element exchange is an array of lock-free stacks. Element i of the array contains data elements that different workers found that belong to worker i. Since multiple workers may concurrently find elements that belong to the same worker, the element of the array can implement a thread-safe collection. A lock-free queue, vector protected by a lock, etc. can also be used.

Within computer architecture 100, storage buffers 108A, 108B, 108C, can collectively function as an element exchange, for example, representing an array of lock-free stacks. For example, storage buffer 108A can be a lock free stack to store data mapped to worker thread 103A, storage buffer 108B can be a lock free stack to store data mapped to worker thread 103B, storage buffer 108C can be a lock free stack to store data mapped to worker thread 103C, etc.

Figure 3:
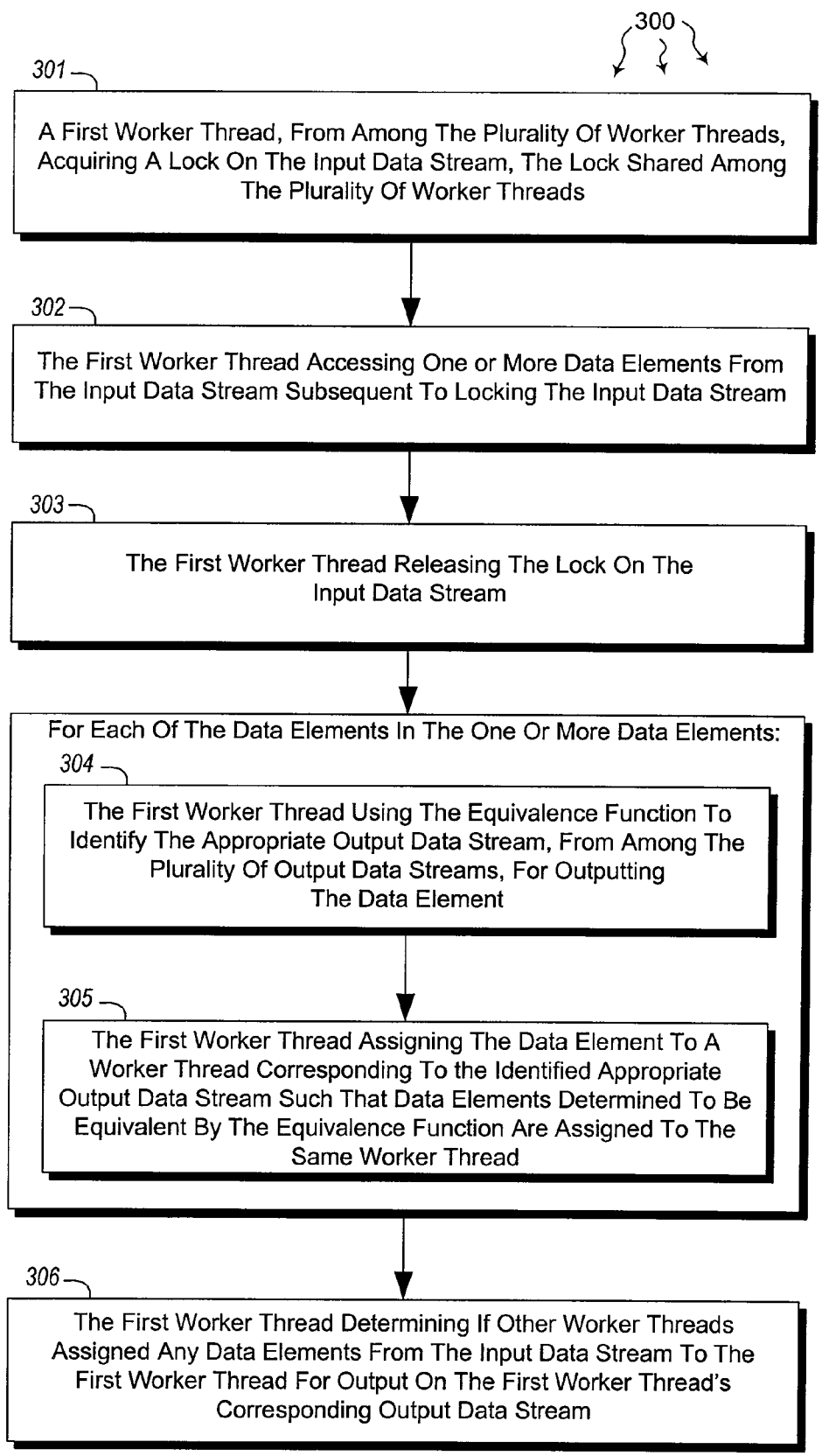
FIG. 3 illustrates a flow chart of an example method for distributing elements from an input data stream across a plurality of output data streams.

FIG. 3 illustrates a flow chart of an example method 300 for distributing elements from an input data stream across a plurality of output data streams. Method 300 will be described with respect to the components and data in computer architecture 100.

Method 300 includes an act of a first worker thread, from among the plurality of worker threads, acquiring a lock on the input data stream, the lock shared among the plurality of worker threads (act 301). For example, worker thread 103B can submit lock acquisition 111 to lock 102. Lock 102 can respond to worker thread 103B indicating that is has acquired lock 102. Method 300 includes an act of the first worker thread accessing one or more data elements from the input data stream subsequent to locking the input data stream (act 302). For example, worker thread 103B can access data elements 101A, 101B, and 101C from input data stream 101. Worker thread 103B can also remove data elements 101A, 101B, and 101C from input data stream 101. Method 300 includes an act of the first worker thread releasing the lock on the input data stream (act 303). For example, worker thread 103B can send lock release 112 to lock 102 to release lock 102 thereby making lock 102 available to other worker threads.

For each data element in the one or more data elements, method 300 includes an act of the first worker thread using the equivalence function to identify the appropriate output data stream, from among the plurality of output data streams, for outputting the data element (act 304). For example, equivalence module 104B can identify output data stream 109A as the appropriate output data stream for outputting data element 101A. Similarly, equivalence module 104B can identify output data stream 109B as the appropriate output data stream for outputting data element 101B. Likewise, equivalence module 104B can identify output data stream 109C as the appropriate output data stream for outputting data element 101C.

For each data element in the one or more data elements, method 300 includes an act of the first worker thread assigning the data element to a worker thread corresponding to the identified appropriate output data stream such that data elements determined to be equivalent by the equivalence function are assigned to the same worker thread (act 305). For example, assignment module 106B can store data element 101A in storage buffer 108A (potentially along with other data elements determined to be equal to data element 101A at other worker threads). Similarly, assignment module 106B can store data element 101C in storage buffer 108C (potentially along with other data elements determined to be equal to data element 101C at other worker threads). Assignment module can also send data element 101B to output module 107B for output in output data stream 109B.

Method 300 includes an act of the first worker thread determining if other worker threads assigned any data elements from the input data stream to the first worker thread for output on the first worker thread's corresponding output data stream (act 306). For example, worker thread 103B can determine if storage buffer 108B contains any data elements. If storage buffer 108B contains data elements, worker thread 103B can send the data elements to output module 107B for output on output data stream 109B.

Other worker threads in computer architecture 100 can also implement method 300, including determining data element equivalence, assigning data elements to other work threads, and checking storage buffers for assigned data elements, in parallel with worker thread 103B.

For example, before or after worker thread 103A obtains lock 102, worker thread 103A can submit lock acquisition 181 to lock 102. Lock 102 can respond to worker thread 103A indicating that is has acquired lock 102. Worker thread 103A can access data elements 182 from input data stream 101. Worker thread 103A can then send lock release 183 to lock 102 to release lock 102 thereby making lock 102 available to other worker threads. Equivalence module 104A can determine the equivalence of individual data elements in data elements 182 and assignment module 106A can assign indication data elements to appropriate storage buffers or to output module 107A.

Worker thread 103A can also determine if storage buffer 108A contains any data elements. If storage buffer 108A contains data elements, such as, for example, data element 101A, worker thread 103A can send the data elements to output module 107A for output on output data stream 109A.

Worker thread 103C can implement similar operations, including outputting data element 101C on output data stream 109C.

Figure 2:
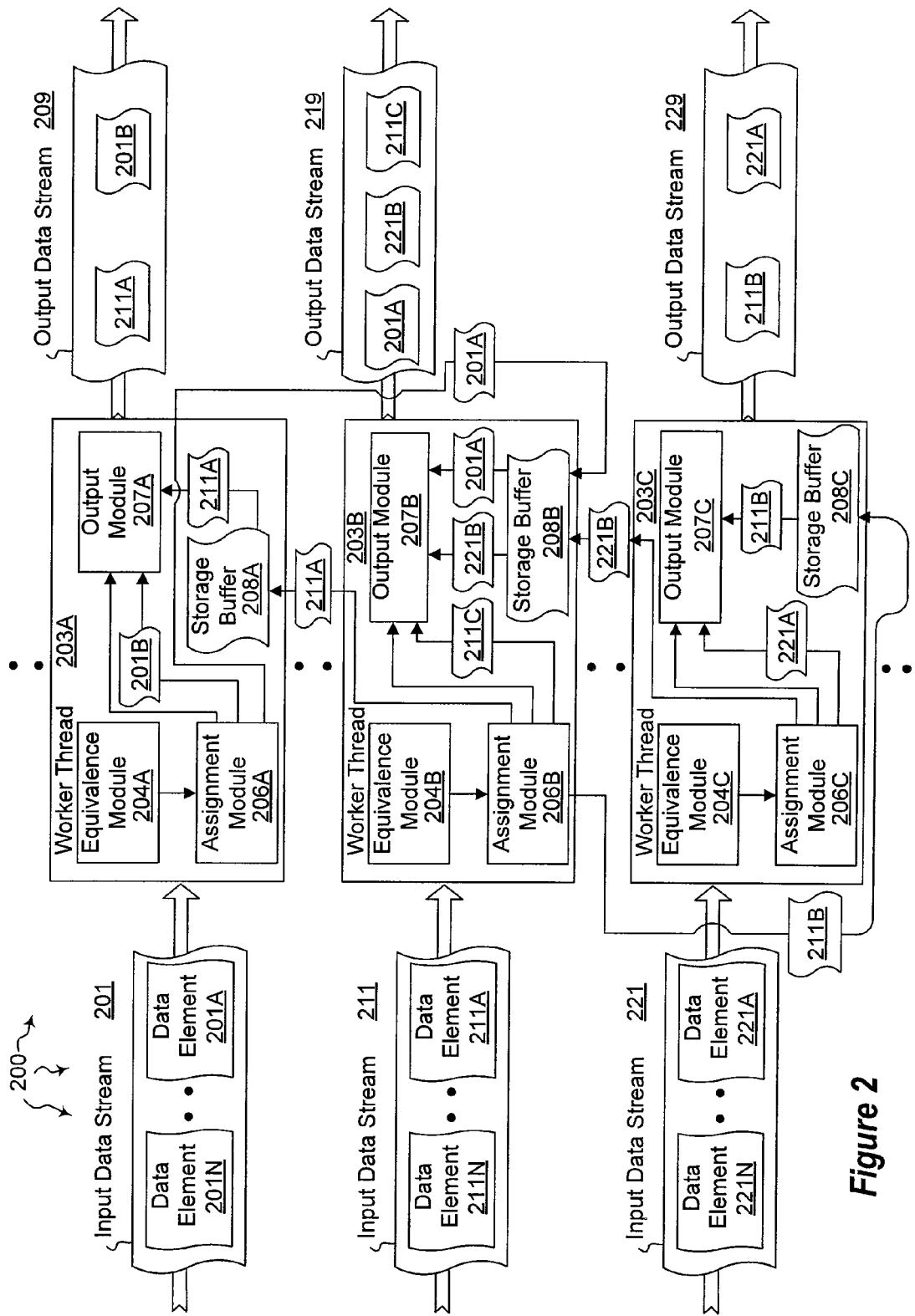
FIG. 2 illustrates an example computer architecture that facilitates repartitioning a plurality of input data streams.

FIG. 2 illustrates an example computer architecture 200 that facilitates repartitioning a plurality of input data streams. Referring to FIG. 2, computer architecture 200 includes input data streams 201, 211, and 221, worker threads 203A, 203B, and 203C, and output data streams 209, 219, and 229. Additional input data streams, worker threads, and corresponding output data streams (not depicted) can also be present. Each of the components (depicted and not depicted) can be connected to one another over (or be part of) a network, such as, for example, a Local Area Network ("LAN"), a Wide Area Network ("WAN"), and even the Internet. Accordingly, each of the depicted computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), and Simple Mail Transfer Protocol ("SMTP"), etc.) over the network.

Similar to computer architecture 100, each worker thread includes an equivalence module, an assignment module, an output module, and a storage buffer. For example, worker thread 203A includes equivalence module 204A, assignment module 206A, output module 207A, and storage buffer 208A. Similarly, worker thread 203B includes equivalence module 204B, assignment module 206B, output module 207B, and storage buffer 208B. Likewise, worker thread 203C includes equivalence module 204C, assignment module 206C, output module 207C, and storage buffer 208C.

Generally, data elements in input data stream 201 (e.g., data elements 201A through 201N), input data stream 211 (e.g., data elements 211A through 211N), and input data stream 221 (e.g., data elements 221A through 221N) are streamed to corresponding worker threads 203A, 203B, and 203C respectively. As data elements are accessed at each worker thread, an equivalence module is used to determine equivalence for each data element in accordance with an equivalence function. Each equivalence module can implement the same equivalence function. For example, equivalence modules 204A, 204B, and 204C, can implement the same equivalence function. Thus, equivalence between data elements from input data streams 201, 211, and 221 can be uniformly determined.

Input data streams 201, 211, and 221 can represent data in an existing set of partitions. For example, output data streams 109A, 109B, and 109C could correspond to input data streams 201, 211, and 221 respectively. Thus, each of input data streams 201, 211, and 221 can include data determined to be equivalent by a prior equivalence function (e.g., the equivalence function implemented at equivalence modules 104A, 104B, 104C, etc.). Worker threads 203A, 203B, and 203C, can re-partition the data from input data streams 201, 211, and 221 in accordance with a (potentially, and most likely, different) equivalence function implemented at equivalence modules 204A, 204B, and 204C.

Figure 4:
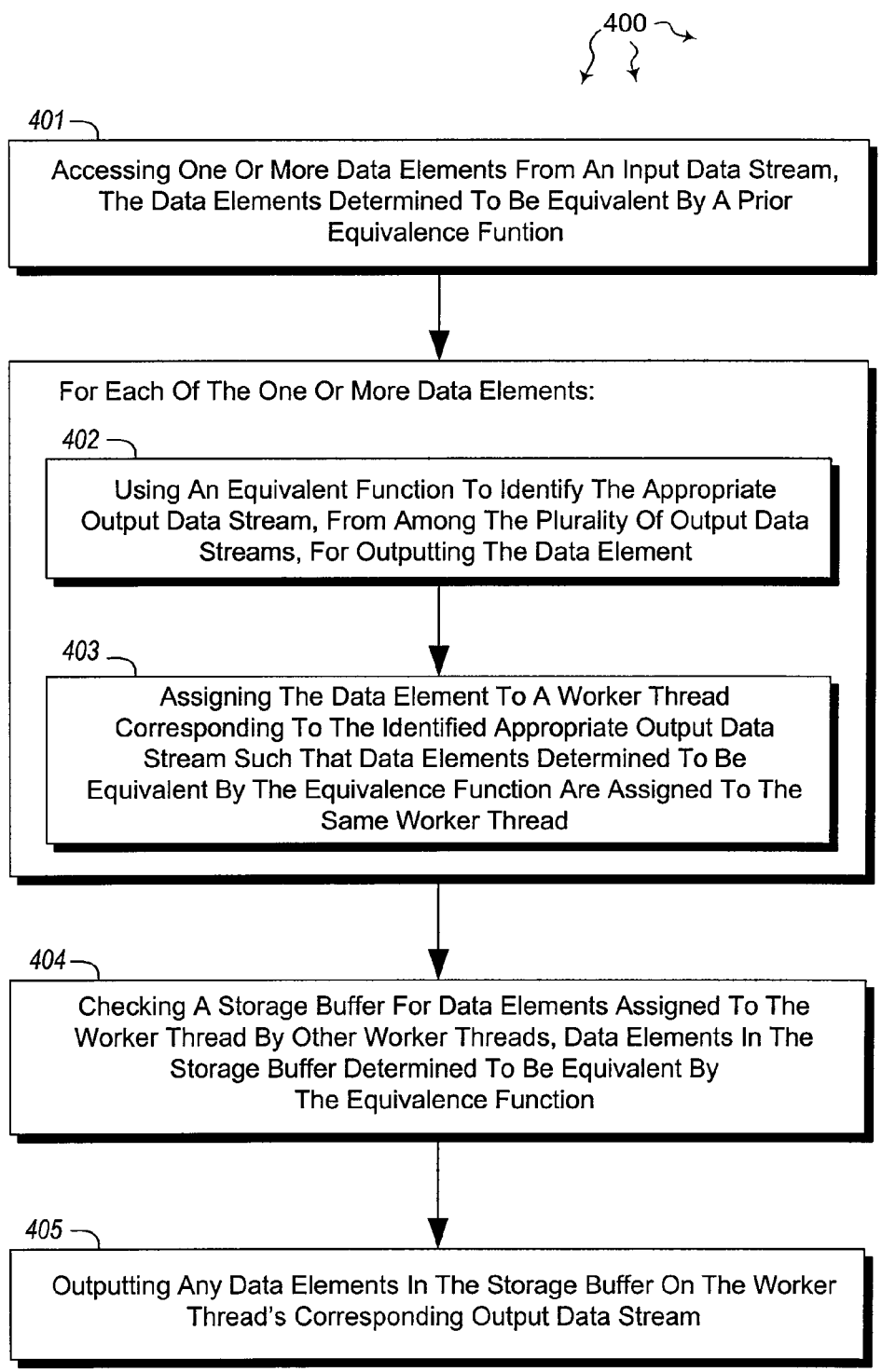
FIG. 4 illustrates a flow chart of an example method for repartitioning a plurality of input data streams.

FIG. 4 illustrates a flow chart of an example method 400 for repartitioning a plurality of input data streams. Method 400 will be described with respect to the components and data in computer architecture 200.

At each of a plurality of worker threads:

Method 400 includes an act of accessing one or more data elements from an input data stream, the data elements determined to be equivalent by the prior equivalence function (act 401). For example, worker thread 203A can access data elements 201A and 201B from input data stream 201. Similarly, worker thread 203B can access data elements 211A, 221B, and 211C from input data stream 211. Likewise, worker thread 203C can access data elements 221A and 221B from input data stream 221. After access data elements, workers threads can remove the data elements from the corresponding input data stream.

For each of the one or more data elements, method 400 includes an act of using the equivalence function to identify the appropriate output data stream, from among the plurality of output data streams, for outputting the data element (act 402). For example, equivalence module 204A can identify output data stream 219 as the appropriate output data store for outputting data element 201A and can identify output data stream 209 as the appropriate output data store for outputting data element 201B. Similarly, equivalence module 204B can identify output data stream 209 as the appropriate output data store for outputting data element 211A, can identify output data stream 229 as the appropriate output data store for outputting data element 211B, and can identify output data stream 219 as the appropriate output data store for outputting data element 211C. Likewise, equivalence module 204C can identify output data stream 229 as the appropriate output data store for outputting data element 221A and can identify output data stream 219 as the appropriate output data store for outputting data element 221B.

For each of the one or more data elements, method 400 includes an act of assigning the data element to a worker thread corresponding to the identified appropriate output data stream such that data elements determined to be equivalent by the equivalence function are assigned to the same worker thread (act 403). For example, assignment module 206A can assign data element 201A to storage buffer 208B and can assign data element 201B to output module 207A. Output module 207A can output data element 201B on output data stream 209.

Similarly, assignment module 206B can assign data element 211A to storage buffer 208A, can assign data element 211B to storage buffer 208C, and can assign data element 211C to output module 207B. Likewise, assignment module 206C can assign data element 221A to output module 207C and can assign data element 221A to storage buffer 208B.

Method 400 includes an act of checking a storage buffer for data elements assigned to the worker thread by other worker threads, data elements in the storage buffer determined to be equivalent by the equivalence function (act 404). For example, worker thread 203A can check storage buffer 208A, worker thread 203B can check storage buffer 208B, and worker thread 203C can check storage buffer 208C. Method 400 includes an act of outputting any data elements in the storage buffer on the worker thread's corresponding output data stream (act 405). For example, output module 207A can output data element 211A in output data stream 209. Similarly, output module 207B can output data elements 201A and 221B in output stream 219. Likewise, output module 207C can output data element 211B in output data stream 229.

Thus, during repartitioning, a plurality of worker threads can implement method 400 in parallel.

From time to time, it may be that a worker thread's storage as well as any corresponding input data streams becomes empty. However, other worker threads may still be processing other input data streams. As such, there is some potential for another worker thread to store data elements in the worker thread's storage. Thus, when this occurs, the worker thread can block waiting for other worker threads to complete processing of their input data streams and then check its storage. Alternately to or in combination with blocking, the worker thread can also poll its storage looking for data elements.

Some embodiments of the invention include an equal number of input data streams and worker threads (FIG. 2). Other embodiments of the invention include fewer input data streams than worker threads (FIG. 1). For example, three input data streams can stream data to five worker threads. Further embodiments of the invention include more input data streams than worker threads. For example, six input data streams can stream data to four worker threads.

In any of these embodiments, worker threads can share input data streams and access data from more than one input data stream. Thus, virtually any embodiment has the potential for many-to-many relationship between input data streams and worker threads. Even embodiments that include an equal number of input data streams and worker threads can permit each worker thread to access data from any of the input data streams. Synchronization, locks, etc., can be used when access to an input data stream is shared.

Accordingly, embodiments of the invention can be used to hash partition a stream of data and thus avoids unnecessary memory usage (e.g., associated with buffering). Hash partitioning can be used to split an input sequence (e.g., a data stream) into multiple partitions that can be processed independently. Other embodiments of the invention can be used to hash repartition a plurality of streams of data. Hash repartitioning converts a set of partitions into another set of partitions with the hash partitioned property. Partitioning and repartitioning can be done in a streaming manner at runtime by exchanging values between worker threads responsible for different partitions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, a computer-implemented method for distributing data elements from an input data stream across a plurality of output data streams to facilitate parallel processing of the distributed data elements, the computer-implemented method comprising the following acts:

receiving at a computing system an input data stream comprised of a plurality of data elements for distribution among a plurality of worker threads, with each worker thread providing a separate output data stream for those data elements output by it, and each worker thread having a storage buffer for receiving data elements from other worker threads;

at each worker thread that accesses data elements from the input data stream, performing the following acts:

prior to acquiring a lock on the input data stream when accessing data elements, each worker thread first checking its storage buffer to determine whether a data element has been assigned to it for output on that worker thread's output data stream;

if a data element has been stored in its storage buffer, outputting any data elements stored in its storage buffer to its own output data stream prior to acquiring the lock on the input data stream;

if a data element has not been stored in its storage buffer, then acquiring the lock and using an equivalence function to identify a plurality of data elements that are essentially equivalent in terms of processing requirements; and distributing at least some of the essentially equivalent data elements to one or more storage buffers of one or more other worker threads so that the at least some essentially equivalent data elements are output on separate output data streams corresponding to the one or more other worker threads so as to facilitate parallel processing of the distributed data elements.

2. The method as recited in claim 1, wherein using the equivalence function comprises an act of using a hash function to identify an appropriate output data stream.

3. The method as recited in claim 1, wherein using the equivalence function comprises an act of using the equivalence function to identify an output data stream corresponding to at least one of the one or more other worker threads to which a data element is to be distributed.

4. The method as recited in claim 1, wherein at least one worker thread assigns at least one of the data elements it has accessed to its own output data stream.

5. At a computer system including one or more processors and system memory, a computer-implemented method for distributing data elements from a plurality of input data streams across a plurality of output data streams to facilitate parallel processing of the distributed data elements, the computer-implemented method comprising:

receiving at a computing system a plurality of input data streams each comprised of a plurality of data elements for distribution among a plurality of worker threads, with each worker thread providing a separate output data stream for those data elements output by it, and each worker thread having a storage buffer for receiving data elements from other worker threads;

at each worker thread in the plurality of worker threads that accesses one or more data elements from an input stream, performing the following acts:

prior to acquiring a lock on the input data stream when accessing data elements, each worker thread first checking its storage buffer to determine whether a data element has been assigned to it for output on that worker thread's output data stream;

if a data element has been stored in its storage buffer, outputting any data elements stored in its storage buffer to its own output data stream prior to acquiring the lock on the input data stream;

if a data element has not been stored in its storage buffer, then acquiring the lock and using an equivalence function to identify a plurality of data elements that are essentially equivalent in terms of processing requirements and also using the equivalence function to identify an output data stream for outputting each of the essentially equivalent data elements; and distributing at least some of the essentially equivalent data elements to the storage buffer of one or more other worker threads corresponding to the identified output data stream for the essentially equivalent data elements so that the at least some essentially equivalent data elements are output on separate output data streams corresponding to the one or more other worker threads so as to facilitate parallel processing of the distributed data elements.

6. The method as recited in claim 5, wherein at least one worker thread uses the equivalence function to assign at least one of the data elements it has accessed to its own output data stream.

7. The method as recited in claim 5, wherein using the equivalence function comprises an act of using a hash function to identify an appropriate output data stream.

8. The method as recited in claim 5, wherein each worker thread receives an input data stream that is different than the input data stream received at the other worker threads.

9. In a computer system including one or more processors and system memory, a computer program product comprising physical storage media having computer-executable instructions stored thereon, which when executed by one or more processors, cause the computing system to perform a computer-implemented method for distributing data elements from an input data stream across a plurality of output data streams to facilitate parallel processing of the distributed data elements, and wherein the computer-implemented method is comprised of the following acts:

receiving at a computing system an input data stream comprised of a plurality of data elements for distribution among a plurality of worker threads, with each worker thread providing a separate output data stream for those data elements output by it, and each worker thread having a storage buffer for receiving data elements from other worker threads;

at each worker thread that accesses data elements from the input data stream, performing the following acts:

prior to acquiring a lock on the input data stream when accessing data elements, each worker thread first checking its storage buffer to determine whether a data element has been assigned to it for output on that worker thread's output data stream;

if a data element has been stored in its storage buffer, outputting any data elements stored in its storage buffer to its own output data stream prior to acquiring the lock on the input data stream;

if a data element has not been stored in its storage buffer, then acquiring the lock and using an equivalence function to identify a plurality of data elements that are essentially equivalent in terms of processing requirements; and distributing at least some of the essentially equivalent data elements to one or more storage buffers of one or more other worker threads so that the at least some essentially equivalent data elements are output on separate output data streams corresponding to the one or more other worker threads so as to facilitate parallel processing of the distributed data elements.

10. In a computer system including one or more processors and system memory, a computer program product comprising physical storage media having computer-executable instructions stored thereon, which when executed by one or more processors, cause the computing system to perform a computer-implemented method for distributing data elements from an input data stream across a plurality of output data streams to facilitate parallel processing of the distributed data elements, and wherein the computer-implemented method is comprised of the following acts:

receiving at a computing system a plurality of input data streams each comprised of a plurality of data elements for distribution among a plurality of worker threads, with each worker thread providing a separate output data stream for those data elements output by it, and each worker thread having a storage buffer for receiving data elements from other worker threads;

at each worker thread in the plurality of worker threads that accesses one or more data elements from an input stream, performing the following acts:

prior to acquiring a lock on the input data stream when accessing data elements, each worker thread first checking its storage buffer to determine whether a data element has been assigned to it for output on that worker thread's output data stream;

if a data element has been stored in its storage buffer, outputting any data elements stored in its storage buffer to its own output data stream prior to acquiring the lock on the input data stream;

if a data element has not been stored in its storage buffer, then acquiring the lock and using an equivalence function to identify a plurality of data elements that are essentially equivalent in terms of processing requirements and also using the equivalence function to identify an output data stream for outputting each of the essentially equivalent data elements; and distributing at least some of the essentially equivalent data elements to the storage buffer of one or more other worker threads corresponding to the identified output data stream for the essentially equivalent data elements so that the at least some essentially equivalent data elements are output on separate output data streams corresponding to the one or more other worker threads so as to facilitate parallel processing of the distributed data elements.

* * * * *